Patented Oct. 3, 1950

2,524,433

UNITED STATES PATENT OFFICE 2,524,433

MAGNETIC RECORDING

Charles D. Downs, Newtown, Pa., and John Martin, Trenton, N. J., assignors to Columbian Carbon Company, New York, N. Y., a corporation of Delaware No Drawing. Application December 11, 1947, Serial No. 791,162

10 Claims. (Cl. 252—62.5)

This invention relates to magnetic recording and more particularly to an improved coating composition and base therefor which has remarkable susceptibility to magnetic influences, whereby superior recordings are obtained.

Magnetic recordings are produced by subjecting a coating on a suitable carrier to magnetic influences which are varied by the effect of sound waves impinging on the diaphragm of a recording machine. Various materials have been used heretofore as the base for the coating composition. Some are fairly satisfactory in recording speech, for example, but none affords good recordings of the entire normal range of sound vibrations. In other words, magnetic recording has been restricted by the limited susceptibility of the base material.

It is the object of the present invention to provide an improved base material and coatings including it which afford better reproduction than those heretofore obtainable.

Other objects and advantages of the invention will be apparent as it is better understood by reference to the following specification, in which the preferred embodiments of the invention are described.

In carrying out the present invention, any suitable support such as paper or sheet plastic may be used. Commonly, the support is in the form of a disc which may be mounted on a mechanically actuated turntable. However, it may be in the form of a tape or a sheet adapted to be affixed to a cylinder, or in fact any convenient form which facilitates the recording and reproduction of sound. The support may, therefore, be of any sheet material which is adapted to be coated with compositions including the improved base material. The sheet material is coated preferably in roll form and subsequently cut to provide smaller sheets of the desired size and conformation.

The coating composition consists of the improved base material suspended in a suitable vehicle. Any varnish may be used as the vehicle, provided it is adapted to harden and thus form a film which does not readily check or crack. We prefer to employ a China-wood oil-phenolic resin varnish with a suitable thinner such as petroleum spirit. Such a coating composition may be applied to the support or sheet by any of the well known methods such as spraying, roll-coating, etc. The thickness of the coating may vary, but preferably is between 0.0005 and 0.001 inch.

One of the primary requirements of a suitable base material for preparing coatings for magnetic recording is that the base material may function as an active storage for magnetic impulses. The storage capacity of the base material must be high and must represent sensitivity to a wide range of frequencies in order to get suitable energy for sound reproduction and suitable fidelity of the reproduction. This storage capacity is referred to as the "B" value.

In accordance with the present invention, the improved base material for the coating is copper ferrite having a lower proportion of copper expressed as copper oxide than is present in copper ferrite as heretofore known, which has a copper content equivalent to 33.5% CuO. We have prepared other copper ferrites containing from 24.0% to 30.0% of copper expressed as copper oxide, and find that such compounds are superior products for magnetic recording when embodied in coating compositions and coated on suitable supporting materials.

For the purpose of comparison, the following table gives the results of tests made with copper ferrites having different proportions of copper equivalent to the expressed percentages of copper oxide. The test sheets were made by roller milling the respective pigments in a phenolic varnish, and the tests were then drawn down on cellulose acetate sheeting, using a draw down gauge with a total clearance of 0.0025 inch. This results in a wet film of very close to half the total clearance, and the film thickness is reduced further by loss of the volatile material in the varnish, resulting in a film somewhat less than 1 mil in thickness. A constant tone signal of 500 cycles was recorded on the various sheets, and then energy stored in the coating, as indicated by the intensity of the response in micro amperes, and the coercivity in Oersteds were measured.

| Per Cent CuO | 60% Copper Ferrite Concentration | 70% Copper Ferrite Concentration | Coercivity |
|---|---|---|---|
| 33.5 | 200 | 275 | 290 |
| 30.0 | 210 | 340 | 225 |
| 27.0 | 260 | 400 | 250 |
| 24.0 | 180 | 280 | 300 |
| 20.0 | 100 | 140 | 500 |

From the foregoing, it will be noted that the copper ferrite containing from 24.0 to 30.0% of copper, expressed as copper oxide, shows considerable improvement in the amount of energy stored in the coating, and that the material containing 27.0% of copper, expressed as copper oxide, shows the maximum of signal strength on reproduction.

To prepare copper ferrite having the desired characteristics, either synthetic magnetite (black iron oxide) or synthetic yellow iron oxide may be used. Red and brown synthetic iron oxides are also suitable. These are commercial products obtained by adding a basic precipitant such as sodium carbonate to a solution of an iron salt, and oxidizing the heated solution with air, either with or without metallic iron. Examples of the method of preparing magnetic iron oxide are found in the patent to Fireman No. 802,928. Yellow iron oxides of the type mentioned may be prepared, for example, as described in the Penniman and Zoph Patent No. 1,327,061. These are merely illustrative, since similar products may be made by comparable methods.

The selected iron oxide is mixed with a suitable proportion of cupric oxide, cupric carbonate or cupric hydrate, and the mixture is dried, ground and calcined at temperatures of from 1350° to 1900° F. Following calcination, the material is ball milled with water and a dispersing agent such as sodium silicate or trisodium phosphate, filtered, washed and dried. The final product is copper ferrite, and, depending upon the amount of copper added, the proportion of copper is, expressed as copper oxide, between 24.0 and 30.0%. The material is characterized by low oil absorption, high coercive force, and high relative magnetic energy response as compared with ordinary copper ferrite containing the equivalent in copper of 33.5% CuO.

Copper ferrites, having the desired composition as hereinbefore expressed, may be suspended in a suitable film-forming vehicle. It is desirable to include as much of the copper ferrite as possible while maintaining sufficient flow in the coating composition to permit coating of the supporting material. In general, we prefer to use from 60% to 70% of copper ferrite, although more or less may be used with satisfactory results. However, in all instances the amount of the copper ferrite will be such as to produce in the resultant film a retentivity or storage capacity capable of retaining a magnetic record.

In preparing the coating composition, the pigment and the vehicle are milled, for example, in a three-roller paint mill employing 70% of the copper ferrite and 30% of a China-wood oil-phenolic resin varnish of 25-gallon length. Upward to 50% of thinner such as mineral spirits may be included. The composition is then applied by spraying, roll coating or other means, to a suitable support such as paper or plastic sheeting. The coating is conducted so as to have a dried film thickness preferably between 0.0005 and 0.001 inch. The thickness of the coating has a bearing on the nature of the frequency response of magnetic recording, and preferably should not exceed the maximum stated. The coated support, when dry, is then cut to the desired form, i. e., a sheet, disc or tape, and may be used in a recording machine of any magnetic recording type to record sounds. The recorded sounds can be removed by erasure with a permanent magnet, and the sheet may be used over and over so long as the coating is not cracked or checked.

The following examples will illustrate the method of preparing copper ferrite suitable for the practice of the invention.

*Example I*

Sufficient filter pulp (about 60% solids) is taken to yield 200 pounds of dry, synthetic magnetite (black oxide of iron). The wet pulp is used merely as a convenience. Dry synthetic magnetite may also be employed. To the magnetite is added 77 pounds of cupric oxide (90% CuO) and enough water to make a workable paste containing about 50% solids. This mixture is thoroughly worked until the two oxides are intimately and uniformly blended. The mixture is then spread in shallow pans and dried at 100°-110° C.

After drying, the cake is reduced to lumps of one to three inches in cross-section, and heated at 1652° F. for 20 minutes in a suitable furnace. Thereafter the lumps are cooled in air and then ball milled with water and a dispersing agent. After filtration, washing and drying, the material is ready for use.

The final product of this particular procedure contains 27.0% of copper in terms of CuO, or 6.3% less than the theoretical percentage in cupric ferrite as heretofore known. It is a dense, brownish black powder characterized by low oil absorption, a coercivity force of 250 oersteds, and a relative magnetic energy response of 400 microamperes.

*Example II*

The procedure of Example I may be varied by using 110 pounds of cupric carbonate instead of cupric oxide, and by grinding the dryer cake before heating. It is also preferable to substitute dry grinding for wet milling of the final product. The resulting material is somewhat less dense and has slightly higher oil absorption than the product of Example I.

*Example III*

Sufficient filter pulp (about 30% solids) is taken to yield 200 pounds of dry synthetic yellow iron oxide hydrate. Dry material may be used in place of the pulp. To this is added 80 pounds of cupric carbonate (55% Cu) and enough water to make a workable paste containing about 30% solids. This mixture is thoroughly worked until the two oxides are intimately and uniformly blended. The mixture is then placed in shallow pans and dried at 100°-110° C. The dry cake is then ground to powder in a suitable mill and then fed into a furnace where it is heated for 20 minutes to 1832° F. After cooling in the air, the material is again ground, preferably in a dry grinder. The final product contains 24.0% copper in terms of CuO or 9.6% less than the theoretical percentage for cupric ferrite. It is less dense than the material of Example I, and has a coercive force of 500 oersteds.

*Example IV*

The procedure of Example III may be modified by substituting 56 pounds of cupric oxide for the cupric carbonate. It may also be calcined in lump form, usually without the necessity for wet milling the final product.

It is to be understood that the foregoing examples are merely illustrative and that the proportions and details of procedure may be modified, using copper compounds in proportions to afford a product containing the equivalent in copper of from 24.0% to 30.0% CuO. The resulting copper ferrites, as hereinbefore indicated, display measurably improved intensity of reproduction when combined in a coating composition applied to a suitable support.

Various changes may be made, therefore, in the details of the invention as described without departure therefrom or sacrificing the advantages thereof.

We claim:

1. A liquid coating composition comprising a liquid film-forming vehicle and copper ferrite containing copper equivalent to about 27% of copper oxide suspended in the vehicle, the copper ferrite being present in amount sufficient to produce a retentivity capable of retaining a magnetic record.

2. A liquid coating composition comprising from about 30% to 40% of a liquid film-forming vehicle and from about 60% to 70% of copper ferrite containing copper equivalent to about 27% of copper oxide suspended in the vehicle.

3. A liquid coating composition comprising a liquid varnish vehicle and copper ferrite containing copper equivalent to about 27% of copper oxide suspended in the vehicle, the copper ferrite being present in amount sufficient to produce a retentivity capable of retaining a magnetic record.

4. A liquid coating composition comprising from about 30% to 40% of a liquid varnish vehicle and from about 60% to 70% of copper ferrite containing copper equivalent to about 27% of copper oxide suspended in the vehicle.

5. A liquid coating composition as set forth in claim 3 in which the liquid varnish vehicle is a China-wood oil-phenolic resin varnish.

6. A liquid coating composition as set forth in claim 4 in which the liquid varnish vehicle is a China-wood oil-phenolic resin varnish.

7. A sound recording device comprising a film for magnetic recording including copper ferrite containing copper equivalent to about 27% of copper oxide in a hardened residue of a film-forming vehicle, said film being between about 0.0005 and 0.001 inch in thickness, and containing copper ferrite in amount sufficient to produce a retentivity capable of retaining a magnetic record.

8. A sound recording means for magnetic recording comprising a supporting sheet and a film thereon comprising copper ferrite containing copper equivalent to about 27% of copper oxide in a hardened residue of a film-forming vehicle, the amount of said copper ferrite in said film being sufficient to produce a retentivity capable of retaining a magnetic record.

9. A sound recording means for magnetic recording comprising a supporting sheet and a film thereon of copper ferrite containing copper equivalent to about 27% of copper oxide in a hardened residue of a film-forming vehicle, said film being of a thickness between about 0.0005 and 0.001 inch, and containing copper ferrite in amount sufficient to produce a retentivity capable of retaining a magnetic record.

10. A sound recording means for magnetic recording comprising a supporting sheet and a film thereon of copper ferrite containing copper equivalent to about 27% of copper oxide in a hardened residue of a China-wood oil-phenolic resin varnish, said film being from about 0.0005 to 0.001 inch, and containing copper ferrite in amount sufficient to produce a retentivity capable of retaining a magnetic record.

CHARLES D. DOWNS.
JOHN MARTIN.

REFERENCES CITED

The following references are of record in the file of this patent:

UNITED STATES PATENTS

| Number | Name | Date |
|---|---|---|
| 1,653,467 | O'Neill | Dec. 20, 1927 |
| 1,847,860 | Best | Mar. 1, 1932 |
| 1,946,964 | Cobb | Feb. 13, 1934 |